(12) United States Patent
Suzuki

(10) Patent No.: US 6,951,199 B2
(45) Date of Patent: Oct. 4, 2005

(54) VACUUM GENERATOR IN COMBUSTION ENGINE

(75) Inventor: Kimiyasu Suzuki, Kariya (JP)

(73) Assignee: Advics Co., Ltd., Kariya (JP)

( * ) Notice: Subject to any disclaimer, the term of this patent is extended or adjusted under 35 U.S.C. 154(b) by 34 days.

(21) Appl. No.: 10/792,756

(22) Filed: Mar. 5, 2004

(65) Prior Publication Data

US 2004/0182363 A1 Sep. 23, 2004

(30) Foreign Application Priority Data

Mar. 19, 2003 (JP) ........................................ 2003-075549

(51) Int. Cl.[7] .............................................. F02D 3/00
(52) U.S. Cl. ................... 123/339.11; 123/585; 123/587
(58) Field of Search ........................ 123/339.11, 339.14, 123/319, 184.21, 404, 585, 587, 295

(56) References Cited

U.S. PATENT DOCUMENTS

| | | | | |
|---|---|---|---|---|
| 4,510,904 A | * | 4/1985 | Casey | 123/339.28 |
| 4,783,962 A | * | 11/1988 | Grein | 60/397 |
| 4,899,708 A | * | 2/1990 | Jung | 123/337 |
| 5,950,595 A | * | 9/1999 | Yoshioka et al. | 123/295 |
| 6,321,716 B1 | * | 11/2001 | Mashiki et al. | 123/295 |
| 6,694,948 B2 | * | 2/2004 | Glugla et al. | 123/404 |

FOREIGN PATENT DOCUMENTS

| | | |
|---|---|---|
| EP | 0 724 996 B1 | 8/1996 |
| JP | 2002-371885 | 12/2002 |

* cited by examiner

*Primary Examiner*—Bibhu Mohanty
(74) *Attorney, Agent, or Firm*—Burns, Doane, Swecker & Mathis, LLP

(57) ABSTRACT

A vacuum generator is provided wherein the intake vacuum of a combustion engine is led to a negative pressure device such as a vacuum booster of a brake booster device through a check valve. An idling air passage is connected to a suction pipe of the combustion engine to bypass a throttle valve arranged in the suction pipe. An ejector is arranged in the idling air passage at the downstream of an idle speed control valve in serial relation to the same, and the intake for idling is performed through the ejector. As the intake air flow passing through the idling air passage increases, the intake negative pressure which is generated at a vacuum takeout port of the ejector is further increased in absolute value, whereby the negative pressure device has a negative pressure which is further increased in absolute value.

Figure 1:
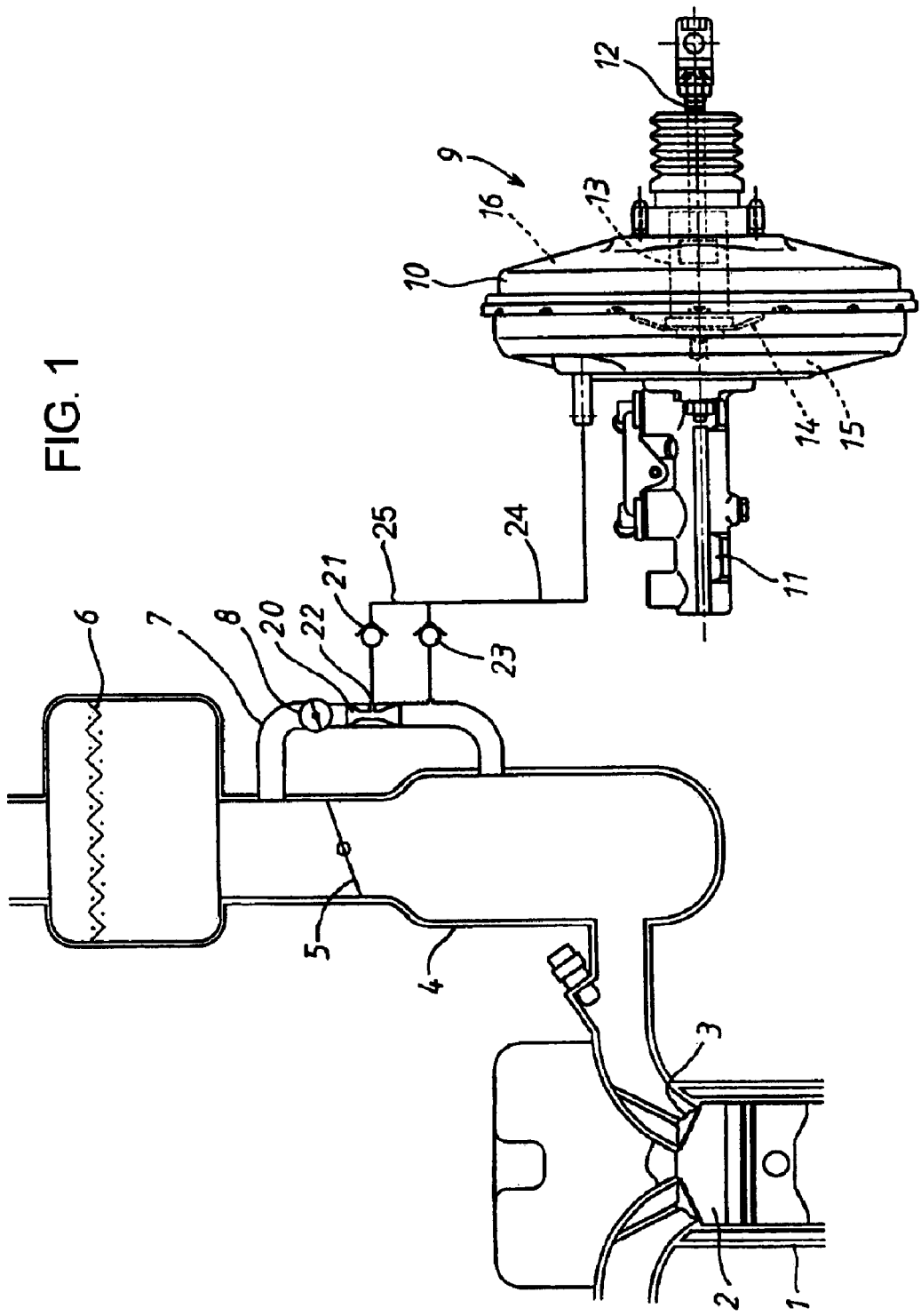

4 Claims, 2 Drawing Sheets

VACUUM GENERATOR IN COMBUSTION ENGINE

INCORPORATION BY REFERENCE

This application is based on and claims priority under 35 U.S.C. sctn. 119 with respect to Japanese Application No. 2003-75549 filed on Mar. 19, 2003, the entire content of which is incorporated herein by reference.

BACKGROUND OF THE INVENTION

1. Field of the Invention

The present invention relates to a vacuum generator for leading an intake negative pressure of a combustion engine to a negative pressure device and for increasing the vacuum pressure in the negative pressure device with another negative pressure which is generated at a vacuum takeout port of an ejector through which a part of the intake air to the engine flows.

2. Discussion of the Related Art

Generally, in a vacuum generator incorporated in a combustion engine of this type, the downstream of a throttle valve arranged in a suction pipe of the combustion engine is connected through a check valve to a negative pressure chamber of a vacuum booster incorporated in a brake booster device. An ejector is connected to the suction pipe to bypass the throttle valve, and a vacuum takeout port of the ejector is connected to the negative pressure chamber of the vacuum booster through another or second check valve. In the vacuum generator of this construction, the air volume which flows through the ejector to bypass the throttle valve varies in dependence on the ambient temperature and the atmospheric pressure. This causes an actual intake air volume to vary with respect to the opening degree of the throttle valve which is to attain a desired intake air volume of the combustion engine, so that a problem arises in that the control of the combustion engine becomes unstable.

Japanese unexamined, published patent application No. 2002-371885 describes a vacuum generator designed to solve this problem. In the known device, the air volume which flows through an ejector is calculated based on the area for a flow passage of the ejector, the ambient temperature and the atmospheric pressure. The opening degree of a throttle valve is compensated in dependence on the air volume which bypasses the throttle valve, so that the intake air volume to a combustion engine can be controlled to a desired volume.

However, in the aforementioned vacuum generator, a temperature sensor and an atmospheric pressure sensor have to be provided for measuring the ambient temperature and the atmospheric pressure, and the air volume that flows through the ejector has to be obtained by calculation. This gives rise to another problem that the vacuum generator becomes complicated in construction and increased in cost.

SUMMARY OF THE INVENTION

Accordingly, in view of the foregoing problems involved in the prior art, it is a primary object of the present invention to provide an improved vacuum generator in a combustion engine which is capable of generating an increased negative pressure in a simplified construction.

Briefly, in a vacuum generator in a combustion engine according to the present invention, an idling air passage incorporating an idle speed control valve for controlling the idling rotational speed of the combustion engine is connected to a suction pipe to bypass a throttle valve arranged in the suction pipe. The vacuum generator is provided with conduit means for leading the intake negative pressure of the combustion engine to a negative pressure device through a check valve. The vacuum generator is further provided with an ejector for permitting a part of the intake air volume toward the combustion engine to flow therethrough thereby to generate a negative pressure at a vacuum takeout port thereof, and the negative pressure generated at the vacuum takeout port is utilized to increase the absolute value of the negative pressure led to the negative pressure device. The ejector is arranged in the idling air passage at the downstream of the idle speed control valve in serial relation to the same so that the air flow from an inflow port to an outflow port of the ejector is inhaled into the combustion chamber of the combustion engine.

With this configuration, the intake negative pressure of the combustion engine is led to the negative pressure device through the check valve. In the idling air passage which is connected to the suction pipe of the combustion engine to bypass the throttle valve, the ejector is arranged at the downstream of the idle speed control valve in serial relation to the same, and air intake for idling is performed through the ejector. The air flow for idling increases the absolute value of the negative pressure which is generated at the vacuum takeout port of the ejector, so that the absolute value of the negative pressure in the negative pressure device is further increased by the increased negative pressure generated at the vacuum takeout port.

The idle speed control valve on the idling air passage which is already provided for the combustion engine is controlled for a desired engine rotational speed in such a way that the opening degree thereof is controlled for idling-up when an air conditioner, a power steering device and the like are brought into operation during the idling operation of the combustion engine. Thus, even with the ejector arranged in serial relation to the idle speed control valve, it does not occur that the actual intake air volume varies extraordinarily thereby to make the engine rotational speed unstable. And, it is not needed to additionally provide a complicated control device for calculating the air volume which flows through the ejector, based on measured values from an ambient temperature sensor and an atmospheric pressure sensor to compensate the opening degree of the throttle valve in dependence on the calculated value. Therefore, the vacuum generator capable of generating an increased negative pressure and being inexpensive can be provided only by arranging the ejector at the downstream of the idle speed control valve in serial relation to the same in the idling air passage.

BRIEF DESCRIPTION OF THE ACCOMPANYING DRAWINGS

Figure 2A:
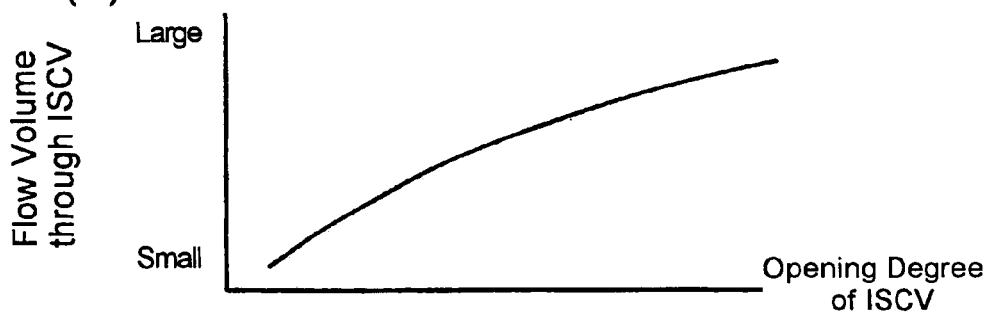
Figure 2B:
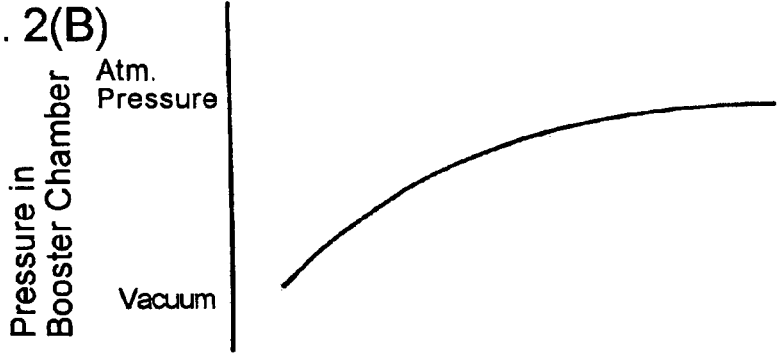
Figure 2C:
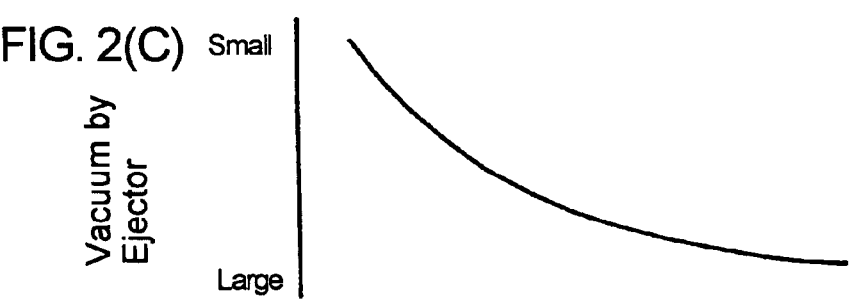

The foregoing and other objects and many of the attendant advantages of the present invention may readily be appreciated as the same becomes better understood by reference to the preferred embodiment of the present invention when considered in connection with the accompanying drawings, wherein like reference numerals designate the same or corresponding parts throughout several views, and in which:

FIG. 1 is a schematic view partly in section of an intake system for a combustion engine incorporating a vacuum generator in one embodiment according to the present invention; and FIGS. 2(A), 2(B) and 2(C) are graphs respectively showing intake flow volume for idling, intake negative pressure and negative pressure increase by an ejector in relation to the opening degree of an idle speed control valve.

DETAILED DESCRIPTION OF THE PREFERRED EMBODIMENT

A vacuum generator in one embodiment according to the present invention will be described hereinafter with reference to the accompanying drawings. Referring now to FIG. 1 schematically showing an engine intake system, a numeral 1 denotes a combustion engine having combustion chambers 2 (one only shown), each of which is connected to a suction pipe 4 through an intake valve 3. At a throttle valve section of the suction pipe 4, there is provided with a throttle valve 5, whose opening degree is controllable by a throttle actuator (not shown) in dependence on the driving state of the engine. The suction pipe 4 opens to the atmosphere through a filter element 6. A numeral 7 denotes an idling air passage, which is connected to the suction pipe 4 at the upstream and downstream of the throttle valve 5 to bypass the same. The idling air passage 7 incorporates therein an idle speed control valve (ISCV) 8 for controlling the intake air volume when the engine 1 remains in the idling operation. The idling air passage 7 may be constituted by, e.g., a metallic tube or a suitable conduit.

A numeral 9 denotes a brake booster device, which is operable for strengthening or reinforcing the driver's stepping force exerted on a brake pedal (not shown) by a vacuum booster 10 serving as negative pressure device thereby to pressure a piston rod (not shown) of a master cylinder 11 with the reinforced force, so that fluid pressure depending on the stepping force is delivered from the master cylinder 11 to wheel brake cylinders (not shown) of vehicle road wheels (not shown). An operating rod 12 axially movable by the brake pedal back and forward is mechanically connected to the piston rod of the master cylinder 11 via a servo valve 13. The interior of the vacuum booster 10 is partitioned by a diaphragm 14 into a negative pressure (i.e., vacuum) chamber 15 and a variable pressure chamber 16. When the brake pedal is stepped on to bring the servo valve 13 into operation, the atmospheric pressure is led to the variable pressure chamber, and a pressure difference between the negative pressure chamber 15 and the variable pressure chamber 16 is exerted on the diaphragm 14, whereby the stepping force applied on the brake pedal is reinforced to pressure the piston rod of the master cylinder 11.

An ejector 20 is arranged in the idling air passage 7 at the downstream of the idle speed control valve 8 in serial relation to the same so that the air flow going from an inflow port to an outflow port of the ejector 20 can be inhaled into the combustion chambers 2 of the combustion engine 1. A main tube or conduit 24 is provided, by which the idling air passage 7 is connected at the downstream of the ejector 20 to the negative pressure chamber 15 of the vacuum booster 10 through a check valve 23 which permits the air to flow from the vacuum booster 10 toward the downstream of the ejector 20. A secondary tube or conduit 25 is further provided, by which a vacuum takeout port 22 of the ejector 20 is connected to the negative pressure chamber 15 through another or second check valve 21 which permits the air to flow from the negative pressure chamber 15 toward the vacuum takeout port 22.

The operation of the vacuum generator in the embodiment according to the present invention will be described hereafter. When the engine 1 is driven, the air flow volume is controlled in dependence on the opening degree of the throttle valve 5, and the controlled air volume is inhaled into each of the combustion chambers 2. Thus, the pressure becomes negative at the downstream of the throttle valve 5 of the suction pipe 4. The intake negative pressure in the suction pipe 4 is led by the main conduit 24 from the downstream side of the ejector 20 in the idling air passage 7 through the check valve 23 to the negative pressure chamber 15 of the vacuum booster 10. The idling air passage 7 has therein the air flow for idling whose volume is controlled in dependence upon the opening degree of the idle speed control valve 8. Thus, the absolute value of the intake negative pressure at the vacuum takeout port 22 of the ejector 20 is increased by the intake air flow for idling which passes through the ejector 20, and the increased intake negative pressure is generated at the vacuum takeout port 22 of the ejector 20. The negative pressure generated at the vacuum takeout port 22 is led by the secondary conduit 25 to the negative pressure chamber 15 through the second check valve 21, whereby the negative pressure chamber 15 has a negative pressure which is further increased in the absolute value.

The idle speed control valve 8 has its opening degree which is controlled in dependence upon the operational state of the engine 1. For example, an air conditioner, a power steering device or the like is brought into operation during the idling operation, the idle speed control valve 8 is controlled to have a larger opening degree in order to heighten the idling rotational speed of the engine 1. As the opening degree of the idle speed control valve 8 becomes larger, the intake air flow passing through the idling air passage 7 increases as shown in FIG. 2(A), and the intake negative pressure becomes smaller in absolute value, whereby the negative pressure in the negative pressure chamber 15 becomes smaller to approach toward the atmosphere, as shown in FIG. 2(B). However, as the intake air flow increases to flow through the idling air passage 7, the volume of the air flow increases to flow from the inflow port of the ejector 20 to the outflow port of the same. Thus, as shown in FIG. 2(C), the negative pressure generated at the vacuum takeout port 22 is further increased in absolute value, and thus, an increased negative pressure generated at the vacuum takeout portion 22 is led to increase the absolute value of the negative pressure in the negative pressure chamber 15 of the vacuum booster 10, so that the brake booster device 9 is enabled to generate a predetermined bake force.

Obviously, numerous modifications and variations of the present invention are possible in light of the above teachings. It is therefore to be understood that within the scope of the appended claims, the present invention may be practiced otherwise than as specifically described herein.

What is claimed is:

1. A vacuum generator in a combustion engine of the type that an idling air passage incorporating an idle speed control valve for controlling the idling rotational speed of said combustion engine is connected to a suction pipe to bypass a throttle valve arranged in said suction pipe, said vacuum generator including:

conduit means for leading the intake negative pressure of said combustion engine to a negative pressure device through a check valve; and an ejector for flowing therethrough a part of the intake air volume toward said combustion engine to generate a negative pressure at a vacuum takeout port thereof and for utilizing the negative pressure generated at said vacuum takeout port to increase the absolute value of the negative pressure led to said negative pressure device, said ejector being arranged in said idling air passage at the downstream of said idle speed control valve in serial relation to the same so that the air flow from an inflow port to an outflow port of said ejector is inhaled into a combustion chamber of said combustion engine.

2. A vacuum generator as set forth in claim 1, wherein said negative pressure device is a vacuum booster of a brake booster device.

3. A vacuum generator as set forth in claim 1, further including another check valve for leading the negative pressure generated at said vacuum takeout port of said ejector to said negative pressure device therethrough.

4. A vacuum generator as set forth in claim 3, wherein said negative pressure device is a vacuum booster of a brake booster device.

* * * * *